United States Patent Office 3,663,600
Patented May 16, 1972

3,663,600
PURIFICATION OF BIS(β-HYDROXYETHYL) TEREPHTHALATE
Wayne V. McConnell, James H. Bond, and Nicholas C. Russin, Kingsport, Tenn., assignors to Eastman Kodak Company, Rochester, N.Y.
No Drawing. Filed Dec. 15, 1969, Ser. No. 885,287
Int. Cl. C07c 69/82
U.S. Cl. 260—475 PR                        6 Claims

ABSTRACT OF THE DISCLOSURE

A process for the purification of bis(β-hydroxyethyl) terephthalate, and particularly that prepared by the esterification of terephthalic acid with ethylene glycol, which comprises dissolving one part of crude bis(β-hydroxyethyl) terephthalate in a hot solvent, treating the solution with from about 0.005 to about 0.5 part, based on the bis(β-hydroxyethyl) terephthalate, of a phosphorus containing component selected from phosphoric acid, phosphorous acid, and phosphate esters having the general formula

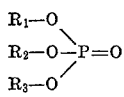

wherein each of $R_1$, $R_2$ and $R_3$ are selected from hydrogen or straight or branched chain alkyl radicals having from 1 to 10 carbon atoms, and wherein the ester contains at least an average of 0.5 acidic hydrogen atoms for each phosphorus atom, filtering the hot solution and cooling the filtrate to cause pure bis(β-hydroxyethyl) terephthalate to crystallize therefrom.

---

This invention relates to a process for the purification of bis(β-hydroxyethyl) terephthalate, and particularly that prepared by the esterification of terephthalic acid with ethylene glycol. The purification is largely based on the use of small amounts of phosphorus compounds to remove impurities such as cobalt and iron, followed by recrystallization from an organic solvent to remove aldehyde impurities and diethylene glycol, both free end esterified. The purified bis(β-hydroxyethyl) terephthalate obtained by the process described herein is useful as an intermediate for the production of poly(ethylene terephthalate) of excellent quality.

Bis(β-hydroxyethyl) terephthalate is prepared by well known procedures such as the direct esterification of terephthalic acid with ethylene glycol, and by the reaction of ethylene oxide with terephthalic acid. When technical or production grade (nonpurified) terephthalic acid is used in the reaction, the bis-hydroxyethyl ester is generally contaminated with metals such as cobalt from the catalyst and iron from the reactor, and with other impurities such as the ester of 4-carboxybenzaldehyde. Diethylene glycol is also formed during the esterification reaction and is often present in excessive concentrations. In addition to the metals referred to above, other metals such as titanium are often used as catalysts for the esterification and are thus present in the monomer composition. In general, these contaminants must be reduced to levels at which their presence would not adversely affect the quality of polyesters manufactured from the bis-hydroxyethyl ester compositions. See, for example, U.S. Pat. No. 3,313,844.

Techniques, not adequate for applicants' purposes, for the purification of bis(β-hydroxyethyl) terephthalate have been disclosed in several patents. One such patent is French 1,508,857 in which a solution of the bis-hydroxyethyl ester is contacted with an activated clay, alumina, silica-alumina, a molecular sieve, an ion exchange resin or an activated carbon (1 to 5% by weight). Solvents used during the treatment and for subsequent crystallization of the ester include water, nitriles, ketones, ethers and esters. In U.S. 3,120,560, purification is effected by carbon treatment (1 to 5% carbon) of solutions of the hydroxyethyl ester in chlorinated hydrocarbons followed by crystallization of the ester. Alcohols containing from 5 to 12 carbon atoms are employed in U.S. 3,268,578 for carbon treatment (1 to 5% carbon) and crystallization of the ester. In U.S. 3,313,844, mentioned above, phosphorus acid esters are employed in the reaction of terephthalonitrile with ethylene glycol in order to prevent discoloration by the free amine.

Objects of the present invention are to provide an improved process for the purification of bis(β-hydroxyethyl) terephthalate; to provide a means of removing metal, aldehyde and diethylene glycol impurities from this intermediate; to provide a product suitable for polycondensation to a polyester of excellent quality; and to provide a commercially practical and efficient process for this purification which is carried out with inexpensive and readily available treating materials.

These and other objects hereinafter appearing have been attained in accordance with the present invention through the discovery of the process comprising dissolving one part of crude bis(β-hydroxyethyl) terephthalate in, for example, from about 1.5 to about 15 parts by weight based on the bis(β-hydroxyethyl) terephthalate, and preferably from about 2 to about 10 parts by weight of a hot solvent such as alcohols, ethers, nitriles, chlorinated hydrocarbons or ketones, but, in particular, one or more esters of the general formula

wherein R and R' are each selected from straight or branched chain alkyl radicals of 1 to about 12, and preferably 1 to 6 carbon atoms, treating the solution with from about 0.005 to about 0.5 part, preferably from 0.01 to 0.3 part, based on the bis(β-hydroxyethyl) terephthalate, of a component selected from phosphoric acid, phosphorous acid, and phosphate esters having the general formula

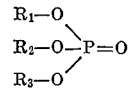

wherein each of $R_1$, $R_2$ and $R_3$ are selected from hydrogen and straight or branched chain alkyl radicals having from 1 to 10 and preferably 1 to 5 carbon atoms, and wherein the ester contains at least an average of 0.5 acid hydrogen atoms for each phosphorus atom, said phosphate ester being used either alone or in conjunction with activated carbon, filtering the hot solution and cooling the filtrate to cause pure bis(β-hydroxyethyl) terephthalate (HET) to crystallize therefrom. Up to about 2 parts of activated carbon based on the HET is adequate. The crystalline product may then be collected by any suitable means, such as filtration or centrifugation, to give highly purified bis(β-hydroxyethyl) terephthalate suitable for the production of poly(ethylene terephthalate) of excellent quality.

When carbon is used it may be incorporated concurrently with the phosphorus composition or it may be employed after the treatment with the phosphorus-containing reagent. Carbon levels of 1% or less (based on the bis(β-hydroxyethyl) terephthalate present) are generally sufficient for this application; larger quantities of carbon may be used but are generally unnecessary.

After the removal of the metal contaminants with the phosphorus compounds, alone or with carbon, the purification of the β-hydroxyethyl ester is completed by the crystallization of the product from the solvent. The crystallization is effective in lowering the aldehyde and diethylene glycol content to levels which are not harmful. If desired, the aldehyde content can be further reduced to lower levels by catalytic hydrogenation.

The present process affords improvements over prior art disclosures. The new process offers the advantages of simplicity and economy and provides a highly purified bis(β-hydroxyethyl) terephthalate. Furthermore, in many of the previous disclosures the presence of the dimer interferes with the process. This is particularly true when the dimer is insoluble in the solvent used for treating and crystallization; the dimer is especially objectionable when water is used as solvent. In the present invention the dimer can be present up to about 25% of the compositions. It is thus understood that the bis(β-hydroxyethyl) terephthalate compositions referred to in this invention may contain up to about 25% of dimer. This aspect of the invention is important because when esterifying terephthalic acid with ethylene glycol, an equilibrium mixture results and the dimer is one of the components.

The removal of metals by the phosphate esters was unexpected. When it was first observed that these esters were effective for this purpose, it was thought that they functioned in a stoichiometric relation. The fact that such low concentrations are efficacious, however, indicate that stoichiometric quantities may not be required. Even when some of the cobalt remains in the purified bis(β-hydroxyethyl) terephthalate, the residual metal does not impart the usual pink color to polymers derived from these monomers; white polymers are obtained from such compositions containing up to 30 p.p.m. cobalt.

In the analyses reported in the following examples, the aldehydes are calculated as 4-carboxybenzaldehyde and the diethylene glycol concentrations include both free and esterified diethylene glycol units.

EXAMPLE 1

Bis(β-hydroxyethyl) terephthalate, which will be referred to as HET, is prepared by esterifying technical grade terephthalic acid with ethylene glycol. The crude hydroxyethyl ester contains 190 p.p.m. of cobalt, 12 p.p.m. of iron, 4.7% of diethylene glycol, and 2500 p.p.m. of aldehydes. A mixture of 200 g. of the crude HET in 600 g. of butyl acetate is stirred and heated at 95° C. until the solid dissolved. To this is added 8 ml. of a 5% solution of ethyl acid phosphate (average molecular weight of 126) in butyl acetate. The temperature is maintained at 100° C. for 15 minutes after the addition of the alkyl acid phosphate. The solution is filtered while hot to remove the solids which separated and the product is allowed to crystallize from the filtrate. The recovered HET is a white crystalline solid containing 19 p.p.m. of cobalt, <0.3 p.p.m. of iron, 185 p.p.m. of aldehyde, and 0.8% of diethylene glycol.

EXAMPLE 2

Example 1 is repeated using 200 g. of crude HET except that the butyl acetate solution of ethyl acid phosphate is replaced with 10 ml. of a butyl acetate solution containing 1% of phosphoric acid (0.05% $H_3PO_4$ based on the HET used). The crystallized product is a white solid with the following analysis: cobalt, <1 p.p.m.; iron, <0.3 p.p.m.; aldehydes, 210 p.p.m.; diethylene glycol, 1.1%.

Virtually the same results are obtained by substituting 0.05% (based on the HET used) of phosphorous acid for the phosphoric acid.

EXAMPLES 3-8

A procedure similar to that disclosed in Example 1 is employed using crude HET having the following analysis: 210 p.p.m. of cobalt, 15 p.p.m. of iron, 3.4% of diethylene glycol and 2350 p.p.m. of aldehyde. The effect of various phosphorus compounds on the removal of cobalt from this HET is shown in Table 1. The phosphorus compounds are added in the indicated amounts as 5% solutions in butyl acetate to 20% solutions of HET in butyl acetate. After the treatments with the phosphorus compounds and crystallization of the refined HET ester from the solvent, all of the products obtained as described in these examples contain less than 1 p.p.m. of iron, less than 1.3% of diethylene glycol and less than 250 p.p.m. of aldehyde.

TABLE 1

| Example Number | Alkyl group of alkyl acid phosphate (A) | Average molecular weight of A | Concentration of A, percent* | Cobalt remaining, p.p.m. |
|---|---|---|---|---|
| 3 | Butyl | 182 | 0.15 | 29 |
| 4 | do | 182 | 0.10 | 25 |
| 5 | do | 154 | 0.10 | 14 |
| 6 | Isoamyl | 203 | 0.30 | 27 |
| 7 | Dodecyl | 350 | 0.30 | 48 |
| 8 | Methyl | 120 | 0.10 | 15 |

*This concentration is based on the quantity of crude HET used.

EXAMPLE 9

To a solution of 200 g. of crude HET (of the analysis shown in Example 1) in 600 g. of butyl acetate heated at 95° C. is added 4 ml. of a 5% solution of ethyl acid phosphate in butyl acetate. The mixture is stirred and the temperature maintained at about 100° C. for 15 minutes. Activated carbon (2 g.) is then added and the mixture held at 100° C. for an additional 15 min. with good agitation. The mixture is filtered while hot and the pure HET allowed to crystallize from the filtrate. The white product has the following analysis: cobalt, <1 p.p.m.; iron, <0.3 p.p.m.; diethylene glycol, 0.9%; aldehyde, 144 p.p.m.

EXAMPLES 10-18

The procedure described in Example 9 is employed using the phosphorus compound, its concentration and the concentration of activated carbon shown in Table 2. The concentrations of the phosphorus compounds and activated carbon are based on the quantity of crude HET used. The purified HET compositions, after the treatments described in these examples and subsequent crystallization in the usual manner, contain less than 1 p.p.m. of iron, less than 0.3% of diethylene glycol and less than 200 p.p.m. of aldehyde. The effectiveness of the treatments on cobalt removal is recorded in Table 2.

TABLE 2

| Ex. No. | Alkyl group of alkyl acid phosphate (A) | Average molecular weight of A | Concentration of A, percent | Concentration of carbon, percent | Cobalt remaining, p.p.m. |
|---|---|---|---|---|---|
| 10 | Ethyl | 126 | 0.05 | 2 | 5 |
| 11 | do | 126 | 0.15 | 0.5 | 1 |
| 12 | Butyl | 180 | 0.15 | 0.5 | 16 |
| 13 | do | 154 | 0.20 | 1 | 2 |
| 14 | do | 180 | 0 10 | 1 | 15 |
| 15 | do | 180 | 0.05 | 1 | 29 |
| 16 | do | 215 | 0.15 | 1 | 19 |
| 17 | Amyl (mixed) | 210 | 0.10 | 1 | 21 |
| 18 | 2-ethylhexyl | 266 | 0.30 | 1 | 14 |

The purified HET obtained by the procedures disclosed in Examples 1 through 18 generally contain approximately 80 to 250 p.p.m. of aldehydes. These products are sufficiently pure to give polyesters of excellent quality. If lower levels of aldehydes are desired, however, further purification can be effected by recrystallization or by hydrogenation.

EXAMPLE 19

One hundred grams of the purified product described in Example 9 (144 p.p.m. of aldehydes) and 500 g. of butyl acetate is heated until solution is effected. The ester is then allowed to recrystallize. The solid after being collected and dried contains about 42 p.p.m. of aldehyde. Such a recrystallization step would be an alternative to hydrogenation in getting very low levels of aldehydes.

EXAMPLE 20

To a solution of 25 lb. of crude HET (1900 p.p.m. of aldehydes) in 75 lb. of butyl acetate heated at 100° C. is added 0.5 lb. of butyl acetate containing 0.025 lb. of ethyl acid phosphate (average molecular weight, 126). After stirring the solution for 10 min. at 100° C., 0.25 lb. of activated carbon is added and the stirring is continued for 15 min. at about this temperature. The carbon and other insoluble contaminants are filtered while the solution is hot. The filtrate containing the HET is hydrogenated in a continuous fixed bed hydrogenation apparatus which employs a 1½" x 30" recycle reactor and a 1½" x 36" final reactor. The catalyst is 0.5% palladium on 4–8 mesh granular carbon. The hydrogenation is carried out at 100° C., 400–600 p.s.i.g. hydrogen, and a feed rate of 3 lbs. of solution per hour. The product which is allowed to crystallize from the effluent contains about 22 p.p.m. of aldehydes.

EXAMPLE 21

Example 9 is repeated except that the starting crude ester contains 150 p.p.m. of titanium, 180 p.p.m. of cobalt, 1.8% of diethylene glycol, and 2300 p.p.m. of aldehydes. The crystallized product is found to contain <1 p.p.m. of titanium, <1 p.p.m. of cobalt, 0.5% of diethylene glycol and 121 p.p.m. of aldehydes.

EXAMPLE 22

Example 9 is repeated except that 400 g. of butyl acetate is used as solvent for the crude ester and the ethyl acid phosphate and carbon treatment is carried out at 110° C. The metals content of the purified product is less than 1 p.p.m.; other impurities are reduced to 1.3% diethylene glycol and 320 p.p.m. of aldehydes.

EXAMPLE 23

Example 9 is repeated except that 2000 g. of butyl acetate is used as solvent and the purification treatment is carried out at 90° C. The metal content of the product is less than 1 p.p.m.; other analyses show the presence of 0.4% diethylene glycol and 78 p.p.m. of aldehydes.

EXAMPLE 24

Example 9 is repeated by replacing butyl acetate with isopropyl acetate, ethyl butyrate, methyl 2-methylbutyrate and hexyl acetate. Purification is satisfactorily achieved with each of these solvents.

The HET purified in the manner described in the foregoing examples is found to be an excellent intermediate for the manufacture of poly(ethylene terephthalate) of markedly reduced color.

The invention has been described with particular reference to certain preferred embodiments thereof, but it will be understood that variations and modifications can be effected within the spirit and scope of the invention as descrbied hereinabove.

We claim:

1. The process which comprises dissolving one part of crude bis($\beta$-hydroxyethyl) terephthalate containing substantial amounts of color forming impurities including cobalt, iron, 4-carboxybenzaldehyde, and diethylene glycol in a hot solvent, selected from esters of the general formula

wherein R and R' are each selected from straight or branched chain alkyl radicals of 1 to 12 carbon atoms, treating the solution with from about 0.005 to about 0.5 part, based on the bis($\beta$-hydroxyethyl) terephthalate, of a phosphorus containing component selected from phosphoric acid, phosphorous acid, and phosphate esters having the general formula

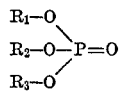

wherein each of $R_1$, $R_2$ and $R_3$ are selected from hydrogen or straight or branched chain alkyl radicals having from 1 to 10 carbon atoms, and wherein the ester contains at least an average of 0.5 acidic hydrogen atoms for each phosphorus atom, filtering the hot solution and cooling the filtrate to cause bis($\beta$-hydroxyethyl) terephthalate to crystallize therefrom substantially free of said impurities.

2. The process of claim 1 wherein R and R' are each selected from straight or branched chain alkyl radicals of 1 to 6 carbon atoms, the concentration of phosphoric acid, phosphorous acid, or phosphate esters is from about 0.01 to 0.3 part, and each of $R_1$, $R_2$ and $R_3$ are selected from hydrogen or straight or branched chain alkyl radicals having from 1 to 5 carbon atoms.

3. The process of claim 1 wherein said phosphorus containing component is used in conjunction with activated carbon.

4. The process of claim 1 wherein the solvent ester is butyl acetate.

5. The process of claim 1 wherein the phosphorus containing component is ethyl acid phosphate.

6. The process of claim 1 wherein the phosphorus containing component is butyl acid phosphate.

References Cited

UNITED STATES PATENTS

| | | | |
|---|---|---|---|
| 3,028,366 | 4/1962 | Engle et al. | 260—475 |
| 3,313,844 | 4/1967 | Matsuhisa et al. | 260—475 |
| 3,439,020 | 4/1969 | Kitabatake et al. | 260—475 |

FOREIGN PATENTS

| | | | |
|---|---|---|---|
| 1,508,857 | 11/1967 | France | 260—475 |

LORRAINE A. WEINBERGER, Primary Examiner

E. J. SKELLY, Assistant Examiner